United States Patent
Mangiapane et al.

(10) Patent No.: US 7,625,039 B2
(45) Date of Patent: *Dec. 1, 2009

(54) SEAT ASSEMBLY PROVIDING AIRFLOW PATH TO COOL BATTERIES

(75) Inventors: Brent R. Mangiapane, Dearborn, MI (US); Kurt Dettloff, Macomb, MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/186,766

(22) Filed: Aug. 6, 2008

(65) Prior Publication Data

US 2008/0296935 A1    Dec. 4, 2008

Related U.S. Application Data

(63) Continuation of application No. 11/755,301, filed on May 30, 2007, now Pat. No. 7,419,209.

(51) Int. Cl.
*B60J 7/00* (2006.01)

(52) U.S. Cl. .................. 296/208; 296/63; 180/65.1; 454/69

(58) Field of Classification Search .......... 296/63, 296/69, 208; 454/69, 120; 180/68.5, 65.1, 180/65.3; 429/99, 100, 163
See application file for complete search history.

(56) References Cited

U.S. PATENT DOCUMENTS

| | | | |
|---|---|---|---|
| 5,937,664 A | 8/1999 | Matsuno et al. |
| 6,220,383 B1 | 4/2001 | Muraki et al. |
| 6,541,151 B2 | 4/2003 | Minamiura et al. |
| 6,662,891 B2 | 12/2003 | Misu et al. |
| 6,902,020 B2 | 6/2005 | Kronner et al. |
| 6,913,878 B2 | 7/2005 | Nakamura et al. |
| 6,978,855 B2 | 12/2005 | Kubota et al. |
| 7,017,361 B2 | 3/2006 | Kwon |
| 2005/0011692 A1 | 1/2005 | Takahashi et al. |

*Primary Examiner*—Joseph D Pape
(74) *Attorney, Agent, or Firm*—Brooks Kushman P.C.

(57) ABSTRACT

Various aspects of the present invention relate to a vehicle seat assembly supportable on a floor of a vehicle having a battery pack disposed behind the vehicle seat, operable to help cool the battery pack, a vehicle battery pack cooling system, and a method of cooling a vehicle battery pack. In at least one embodiment, the vehicle seat assembly comprises a seat bottom comprising a structural support portion made of a first material and a foam seat cushion supported on the structural support portion, with the first material being more resilient than the foam. The structural support portion is supportable on the vehicle floor and, when supported on the floor, communicates with the vehicle floor to form an air flow passage extending under the seat bottom to provide air flow to the battery pack.

20 Claims, 4 Drawing Sheets

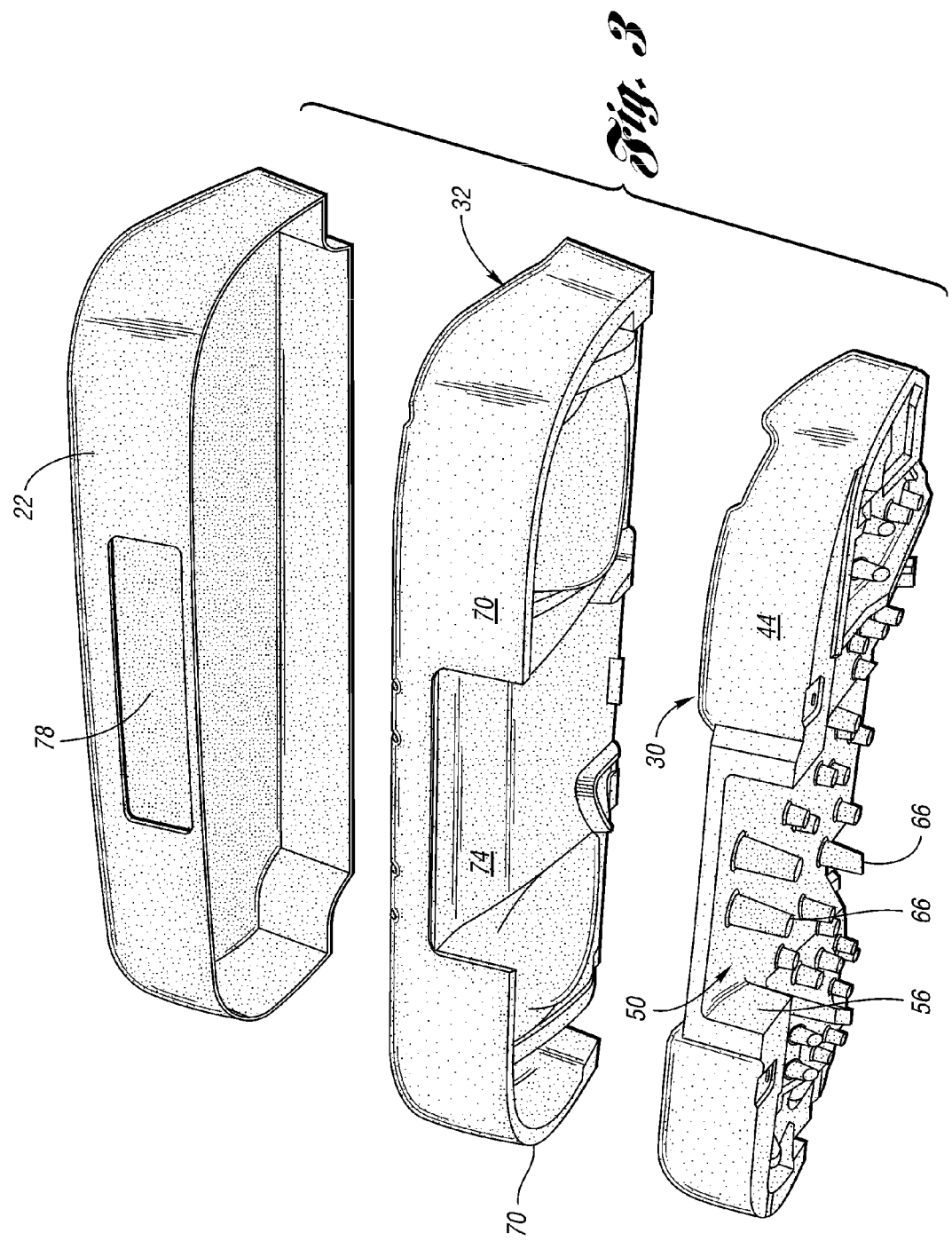

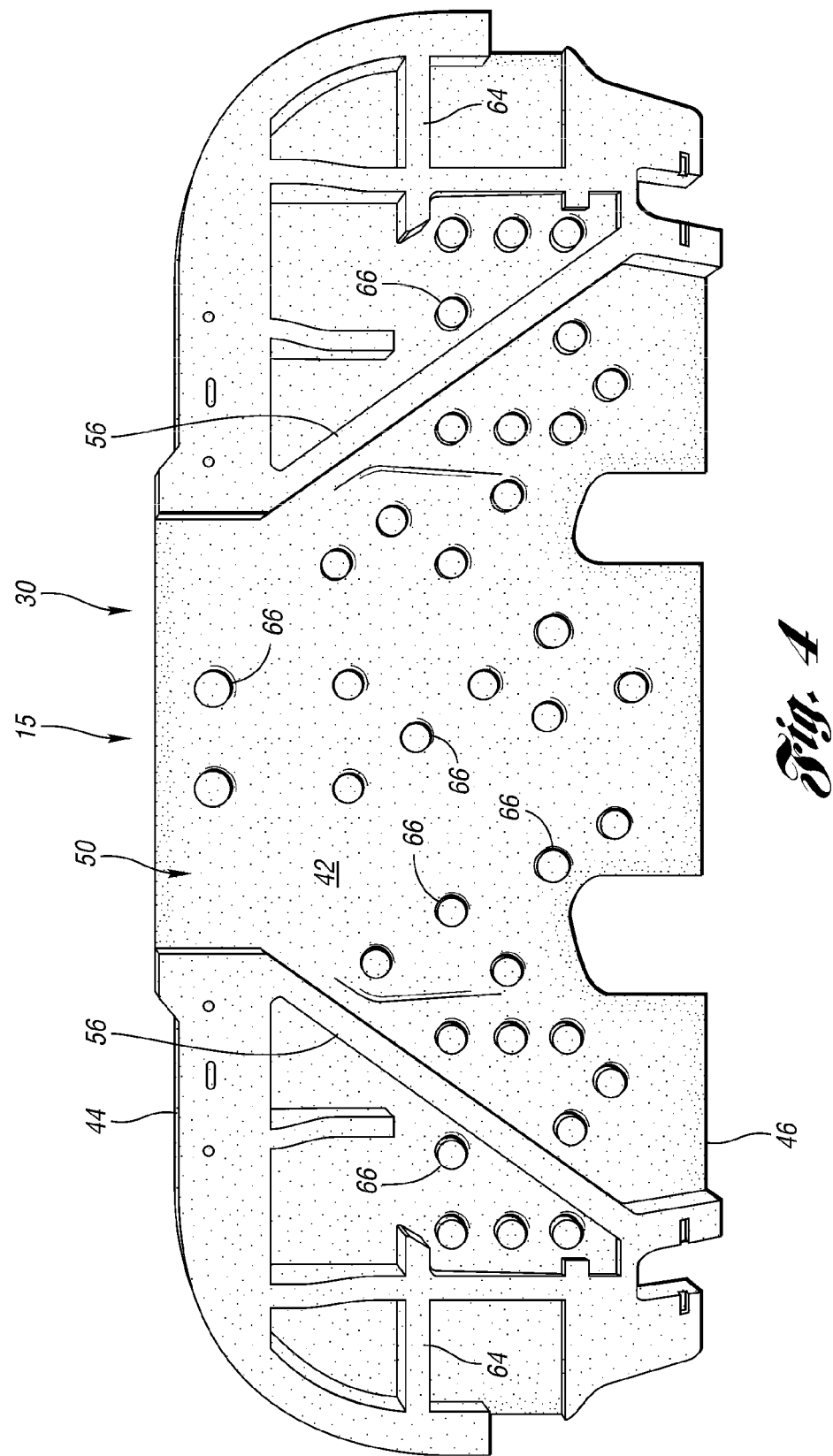

SEAT ASSEMBLY PROVIDING AIRFLOW PATH TO COOL BATTERIES

CROSS-REFERENCE TO RELATED APPLICATIONS

This application is a continuation of U.S. application Ser. No. 11/755,301 filed May 30, 2007, which is incorporated herein by reference.

BACKGROUND OF THE INVENTION

1. Field of the Invention

The present invention relates to a seat assembly that provides an air flow path to cool batteries.

2. Background Art

Vehicle battery cooling systems are known. Examples of known vehicle battery cooling systems include U.S. Pat. Nos. 6,902,020; 6,662,891, 6,541,151; 6,220,383; and 5,937,664; and U.S. Patent Application Publication No. 2005/0011692.

SUMMARY OF THE INVENTION

According to at least one aspect of the present invention, a vehicle seat assembly is provided. In at least one embodiment, the vehicle seat assembly is supportable on a floor of a vehicle having a power source disposed behind the vehicle seat. The vehicle seat assembly comprises a seat bottom and a seat back extending adjacent the seat bottom. In at least this embodiment, the seat bottom comprises a structural support member made of a structural foam material and a cellular foam seat member supported on the structural support portion with the structural foam material being more resilient than the cellular foam seat member. The structural support member is supportable on the vehicle floor and, when supported on the floor, is configured to provide an air flow passage extending under the seat bottom to provide air flow to the power source.

According to at least another aspect of the present invention, a vehicle battery pack cooling system is provided. In at least one embodiment, the vehicle battery pack system comprises a vehicle floor, a seat assembly supported on the vehicle floor, and a battery pack, for providing at least some of the power to the vehicle, supported behind the seat assembly. The vehicle seat assembly comprises a seat bottom and a seat back extending generally vertically from the seat bottom. In at least this embodiment, the seat bottom comprises a structural support portion made of a first material and a foam seat cushion supported on the structural support portion. The structural support portion is supported on the vehicle floor and the structural support portion communicates with the vehicle floor to form at least a portion of an air flow passage extending under the seat bottom. The structural support portion further has a plurality of spaced-apart support members cooperating with the vehicle floor to help support the seat assembly of the vehicle floor.

According to yet at least another aspect of the present invention, a method of cooling a vehicle battery pack located in a vehicle having a vehicle floor is provided. In at least one embodiment, the method comprises supporting a seat assembly on the vehicle floor and supporting a battery pack for providing at least some of the power to the vehicle behind the seat assembly. The vehicle seat assembly comprises a seat bottom and a seat back. In at least this embodiment, the seat bottom comprises a structural support portion made of a first material and a foam seat cushion supported on the structural support portion, with the first material being at least as resilient as the foam. In at least this embodiment, the structural support portion communicates with the vehicle floor to help form an air flow passage extending under the seat bottom. In at least this embodiment, the method further comprises directing air flow through the air passage under the seat to provide cooling to the battery pack.

BRIEF DESCRIPTION OF THE DRAWINGS

FIG. 3 is an exploded view of components illustrated in FIGS. 1 and 2; and FIG. 4 is a schematic perspective view depicting the underside of a component illustrated in FIG. 3.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The Figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within any numerical limits stated is generally preferred. Also, unless expressly stated to the contrary, the description of a group or class of materials by suitably or preferred for a given purpose in connection with the invention implies that mixtures of any two or more members of the group or class may be equally suitable or preferred.

Figure 1:
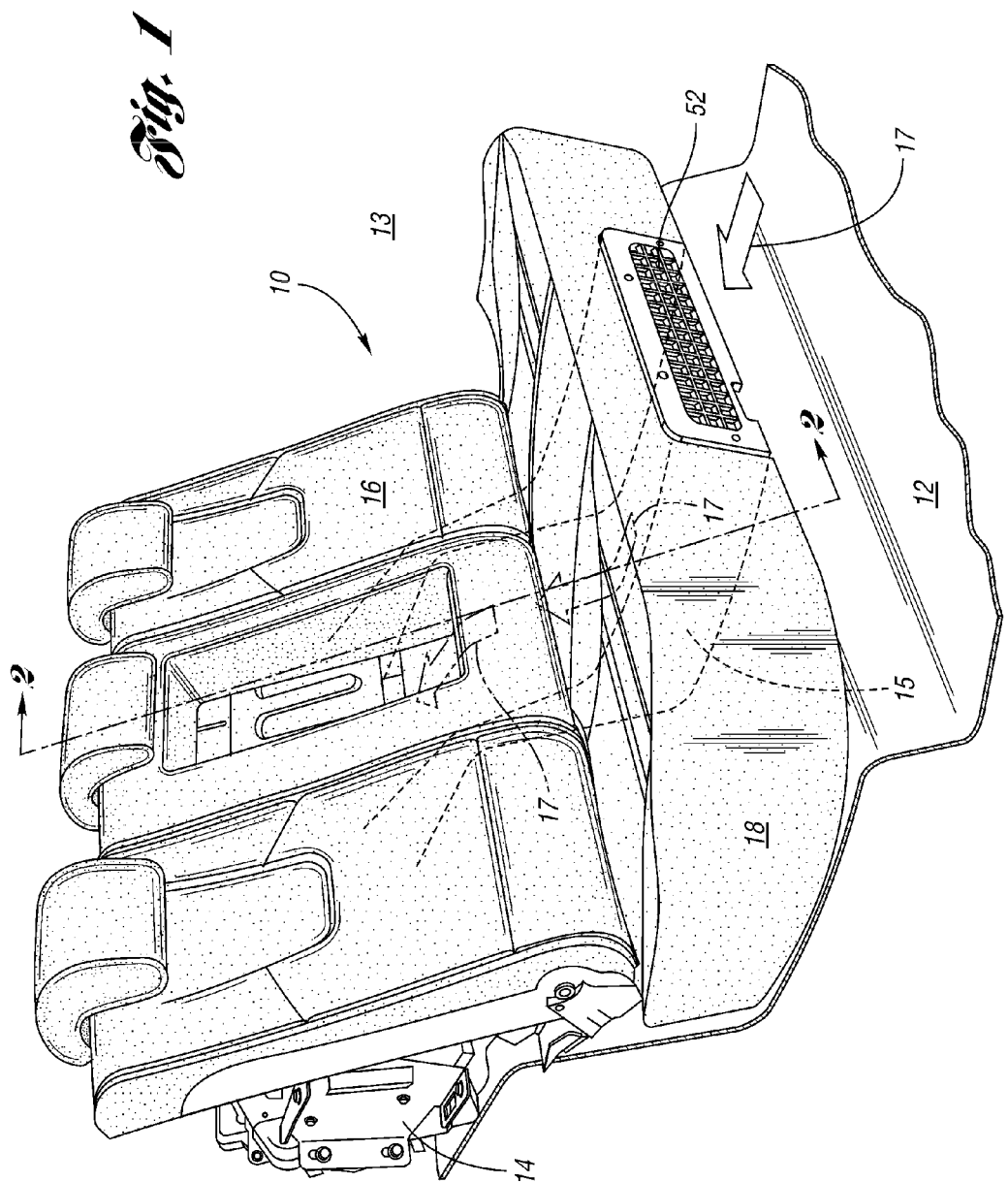
FIG. 1 is a schematic perspective view of a system in accordance with an embodiment of the present invention.

Referring now to the Figures, where like numerals are used to designate like structures throughout the drawings, a schematic vehicle seat assembly in accordance with at least one embodiment of the present invention is generally shown at 10 in FIG. 1. While the vehicle seat assembly 10 is illustrated in FIG. 1 to be a bench seat assembly, it should be understood that the principles of the invention are applicable to other types of seat assemblies, such as bucket, captain and other types of seat assemblies. It should also be understood that the principles of this invention are applicable to all types of vehicle seat assemblies as well as non-vehicle seat assemblies.

Referring to FIG. 1, the vehicle seat assembly 10 is shown secured to a vehicle floor pan or a vehicle floor 12. The vehicle seat assembly 10 can be secured in any suitable manner. A battery pack, schematically illustrated as 14, or any other suitable power source, such as an electric motor, is shown to be disposed behind the seat assembly 10. In the illustrated embodiment, the battery pack 14 is disposed upon a ledge of the vehicle floor 12 behind the seat assembly 10. The power source 14 can be any suitable battery pack or power source such as an electric motor, for helping to power the vehicle. For instance, the battery pack 14 could be a battery pack or electric motor for an electric vehicle, a hybrid vehicle, or other types of vehicles. As will be explained below in further details, the seat assembly 10 along with the vehicle floor 12 forms an air flow path 15 which helps direct air, schematically illustrated as 17, from the vehicle occupant compartment 13 to the battery pack 14 to cool the battery pack. The air can be from the vehicle occupant compartment or it can be conditioned air from a unit specifically directed into the flow path 15.

The vehicle seat assembly 10 includes a seat back, generally indicated at 16, and a lower seat assembly, generally indicated at 18. In at least the illustrated embodiment, the lower seat assembly 18 has a cushion composite 20 covered by a trim material 22. The seat back 16 can be any suitable type of seat back.

The vehicle seat assembly 10 may also include a seat frame, (not shown) having a plurality of mounting brackets (not shown) adapted to operatively secure the seat frame within a vehicle. The seat frame may be constructed from any material suitable for application within a vehicle seat assembly 10, such as aluminum, steel or other metal alloy, composite material, or a suitable polymer. Further, the seat frame may be manufactured using techniques commonly known in the art, and relative to the type of material employed. By way of example, manufacturing techniques may include stamping, welding, fastening or molding a suitable material to form the seat frame.

As will be explained further below, it should be understood that the frame could optionally be omitted as desired. The cushion composite 20 is received on or around the frame and the trim material 22 is adapted to engage the cushion composite 20 and/or the frame in a covering relationship.

In at least one embodiment, the cushion composite 20 includes a structural layer 30, disposed over a frame (not shown), and a cushion layer 32 that is disposed over the structural layer 30.

In at least one embodiment, the structural layer 30 can be any suitable structural foam material. In at least one embodiment, suitable structural materials will have a rigidity and/or density that is higher than conventional open-cell (cellular) polyurethane foam that is typically employed in seat cushions. In at least one embodiment, suitable structural foam materials have a density of at least 1.75 pounds per cubic foot (pcf), and less than 7.0 pcf. In at least another embodiment, suitable structural foam materials will have a density of 2.0 to 4.0 pcf, and in yet other embodiments of 2.5 to 3.5 pcf. Density of the structural foam material can be measured in accordance with ASTM test method No. D3575.

In at least one embodiment, suitable structural materials will have a compressive strength, at 50% strain, of 0.30 to 0.50 MPa, in at least another embodiment of 0.32 to 0.42 MPa, and in at least another embodiment of 0.35 to 0.39 MPa. Compressive strength can be measured by ASTM test method No. D3575. In at least one embodiment, suitable structural materials will have a tear strength of 1.8 to 3.2 gms/mm, in at least another embodiment of 2.2 to 3.0 gms/mm, and in at least another embodiment of 2.4 to 2.8 gms/mm, as measured in accordance with ASTM test method No. D3575. In at least one embodiment, suitable structural materials will have flexural modulus of 12.5 to 18 MPa, in at least another embodiment of 13.25 to 17 MPa, and in at least another embodiment of 13.5 to 15.5 MPa, as measured in accordance with ASTM test method No. D3575.

In at least one embodiment, the structural layer 30 comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, and the like.

In at least one particular preferred embodiment, the EPO is expanded polypropylene (EPP) and its copolymers with ethylene, propylene and butylene. Any suitable EPP may be used, however in at least one embodiment, suitable EPP's include, but are not limited to, ARPRO® EPP available from JSP International and EPP available from SCA Packaging North America.

Expanded polyolefins can be prepared by a bead polymerization process in which relatively small uniform beads of polymer are produced, containing a gas which is later utilized to effect blowing during the molding process. The most commonly used gas is air although other gases including low boiling point liquids which produce gases at the molding temperatures may be used. Suitable gases include, but are not limited to air, nitrogen, carbon dioxide, pentene and the like.

While the structural layer 30 can have any suitable size and configuration, in at least one embodiment, the structural layer 30 has an average thickness of 5 to 100 mm, in other embodiments of 20 to 70 mm, and in yet other embodiments of 30 to 50 mm.

Although the structural layer 30 has been mainly referred to herein as a structural foam material, it should be understood that the structural layer 30 could also be made of a suitable plastic or metal, however, it has been found that structural foam provides certain benefits relating to recyclability and weight reduction.

The cushion layer 32 can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3575. In at least one embodiment, suitable cushion materials will have a compressive strength, at 50% strain, of 0.017 to 0.030 MPa, in other embodiments of 0.018 to 0.024 MPa, and in yet other embodiments of 0.020 to 0.023 MPa. In at least one embodiment, suitable cushion materials will have a hysteresis of 18 to 30 KPa, in another embodiments of 20 to 28 KPa, and in yet other embodiments of 23-26 KPa. Hysteresis of the cushion material can be measured by ASTM test method No. D3575.

In at least certain embodiments, the cushion material comprises conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred. Soy-based polyurethane can be made with any suitable soy-based polyols, such as those available, but not necessarily limited to, from Bayer, Urethane Soy Systems, and Dow Chemical. Any suitable soy-based polyurethane may be used, however in at least one embodiment, suitable soy-based polyurethanes include, but are not necessarily limited to those available from Woodbridge Foam and Renosol. The cushion layer 32 can be any suitable size and shape, however, in at least one embodiment, the cushion layer 32 has an average thickness of 20 to 100 mm, and in at least another embodiment of 30 to 70 mm, and in still yet other embodiments of 40 to 60 mm.

It should be understood that the structural layer 30 and the cushion layer 32 can have any suitable configuration, shape and size. For instance, as shown in the figures, each layer 30 and 32 have a similar size and construction with the cushion layer 32 being disposed over the structural layer 30.

As can be envisioned, many different configurations of the layers 30 and 32 can be encompassed by the present invention, even those which are not shown or described herein.

As discussed, the vehicle seat assembly 10 also includes trim material 22 which is adapted to engage the cushion composite 20 in a covering relationship. The trim material 22 may include any material known in the art. By way of example, some of the known materials include cloth, leather or polymers of sufficient quality and thickness for use in seat trim applications. Polymer trim materials may include a flexible close cell polymer skin material such as polyvinyl, polyvinyl chloride (PVC), polyester, nylon, thermoplastic olefin (TPO) or thermoplastic urethane (TPU). Additional materials for use as trim material 22, may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass, nylon, polyester or natural fibers may be applied to the foam backing or back of the trim material 22 for increase in strength without increasing rigidity. In at least one particularly preferred embodiment, the trim material 22 comprises polyester or nylon trim material having polyester or nylon trim fasteners (not shown) for securing the trim material 22 to one or more components (i.e., cushion 20 and/or frame) of the vehicle seat assembly 10.

In at least certain embodiments, the layers 30 and 32 of the cushion composite 20 are configured so that they can be easily assembled and disassembled to facilitate assembly and end of line disassembly for recycling. In at least one embodiment, the layers 30 and 32 are not secured to each other by a mechanical fastening. In this embodiment, the layers 30 and 32 are either placed over each other and/or within recesses of an adjustment layer and held together by the overlying trim material 22. In other embodiments, the layers 30 and 32 can have one or more mechanical fastening component to secure the layers 30 and 32 to each other.

Figure 2:
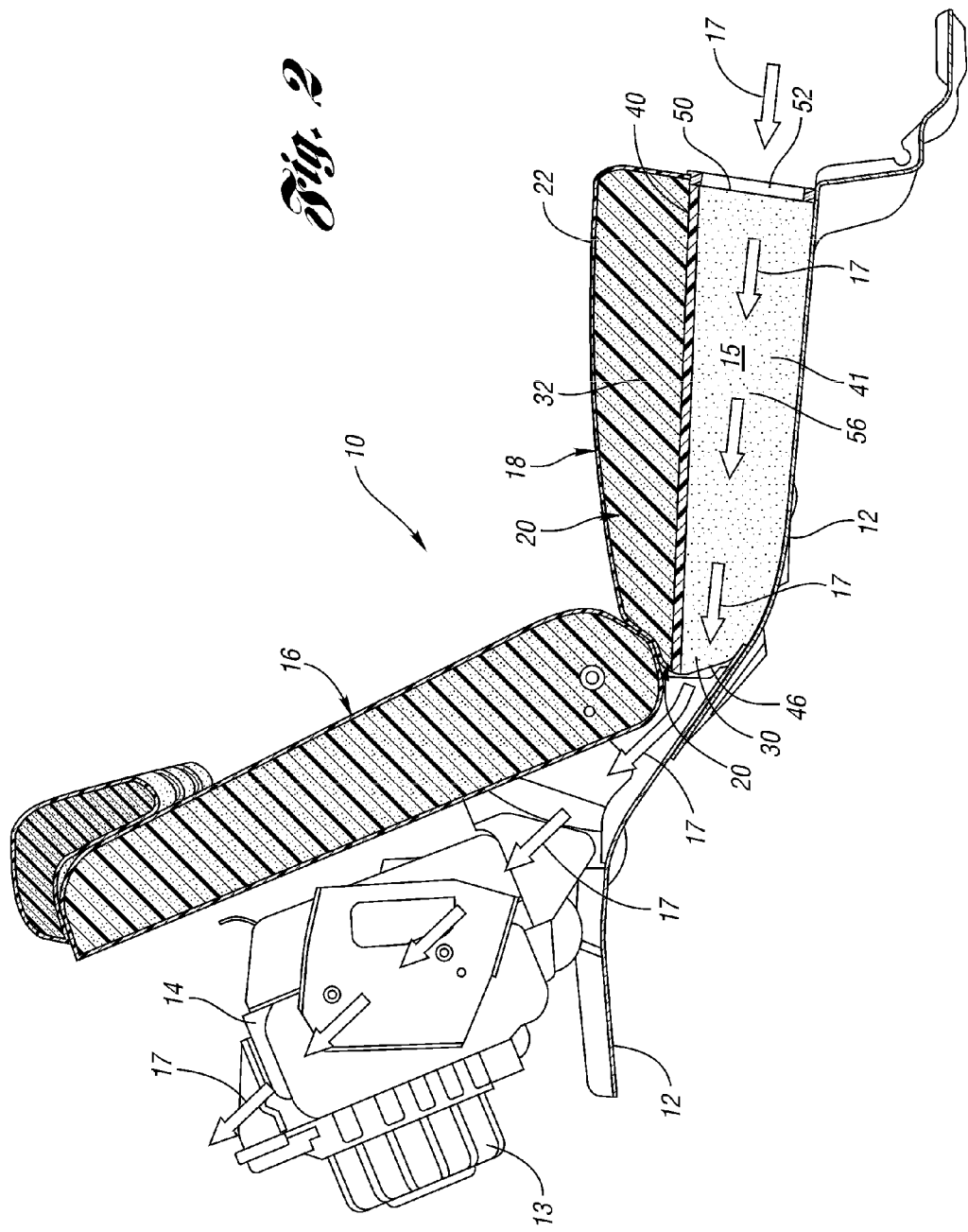
FIG. 2 is a schematic sectional side view of components illustrated in FIG. 1, taken through line 2-2.

Referring to FIGS. 2 to 4, the structural layer 30 of the lower seat assembly 18 includes a top surface 40, a bottom surface 42, a front surface 44 and a rear surface 46. The front surface 44 has an opening 50 that communicates with to the bottom surface 42. As shown in FIG. 1, a grill 52 or other suitable trim member is disposed over the opening 50 to cover the opening while allowing air to enter into the opening. The bottom surface 42 on the structural layer 30 includes a pair of side walls 56 that extend from the front surface 44 of the structural layer 30 to the rear surface 46 of the structural layer 30.

The bottom surface 42 of the structural layer 30 also includes a plurality of depending structures such as bars 64 and rods 66 which help to distribute the weight of the vehicle occupant evenly over the lower seat assembly 18 of the vehicle seat assembly 10. Moreover, side walls 56 also cooperate with the bars 64 and rods 66 to distribute the weight of the vehicle occupant.

Referring to FIG. 3, in at least the illustrated embodiment, the cushion layer 32 has a depending rim portion 70 that fits over at least a substantial portion of the front surface 44 of the structural layer 30. The cushion layer 32, at least in the illustrated embodiment, also includes an opening 74 that is positioned over opening 50 of the structural layer 30 and the trim cover 22 also includes an opening 78 that is positioned over openings 50 and 74.

In at least certain embodiments, when the seat assembly 10 is secured to the vehicle, the side walls 56 of the structural layer 30 extend from the bottom surface 42 of the structural layer 30 to the vehicle floor 12. In at least certain embodiments, the vehicle floor 12 and the side walls 56 and the bottom surface 42 of the structural layer 30 cooperate to define an air flow path 15 that extends under the structural layer 30, and thus the lower seat assembly 18, to provide a path 15 for cooled air 17 to extend underneath the seat assembly 10 back toward the battery pack 14. A fan, shown schematically at 31, can be provided for drawing air to the battery pack 14. While fan 31 is illustrated as being located behind battery pack 14 in FIG. 2, it should be appreciated that battery pack 14 could be located behind fan 13 or that fan 13 could be omitted or replaced with another air moving device.

After the air flows into the opening 50 of the structural layer and through the air flow path 15 under the lower seat assembly 18, the air is then directed out of the back of the lower seat assembly and behind the seat back 16 to the battery pack 14.

While embodiments to the invention has been illustrated and described, it is not intended that these embodiments illustrate and describe all possible forms of the invention. Moreover, the words used in the specification are words of description rather than limitation, and it is understood that various changes may be made without departing from the spirit and scope of the invention.

What is claimed is:

1. A vehicle seat assembly supportable on a floor of a vehicle having a power source disposed behind the vehicle seat, the vehicle seat assembly seat comprising:
   a seat bottom and a seat back extending adjacent the seat bottom, the seat bottom comprising a structural support member made of a structural foam material and a cellular foam seat member supported on the structural support portion, the structural foam material being more resilient than the cellular foam seat member, the structural support member being supportable on the vehicle floor, the structural support portion, when supported on the floor, being configured to provide an air flow passage extending under the seat bottom to provide air flow to the power source.

2. The vehicle seat assembly of claim 1 wherein the seat bottom has a front, a back, a top, and a bottom, the structural support portion having a bottom surface forming at least a substantial portion of the seat bottom and the foam seat cushion having an upper surface forming at least a substantial portion of the top of the seat bottom, the structural support portion having at least two opposed side walls extending between the front and the back of the seat bottom and being supportable on the vehicle floor, the vehicle floor and the opposed side walls cooperating to form at least part of the air flow passage.

3. The vehicle seat assembly of claim 2 wherein the opposed side walls extend substantially at an angle between the front and the back of the seat bottom, and the seat bottom having a plurality of structural members extending from the seat bottom surface of the seat bottom and being supportable on the vehicle floor, the structural members and the side walls providing support for the vehicle seat assembly.

4. The vehicle seat assembly of claim 1 wherein the structural support portion is made of a polymeric material having a density of at least 1.75 pcf when measured in accordance with ASTM test method No. D3575 and a compressive strength, at 50% strain, of 0.30 to 0.50 MPa when measured in accordance with ASTM test method No. D3575.

5. The vehicle seat assembly of claim 4 wherein the polymeric material has a tear strength of 1.8 to 3.2 gms/mm when measured in accordance with ASTM test method No. D3575.

6. The vehicle seat assemble of claim 1 wherein the power source comprises a battery.

7. The vehicle seat assembly of claim 2 wherein the structural support portion has a front wall having an inlet opening, the inlet opening comprising the entry to the air passage.

8. The vehicle seat assembly of claim 7 further comprising a trim register supported within the inlet opening.

9. The vehicle seat assembly of claim 1 wherein the foam seat cushion is adhesively secured to the structural support portion.

10. The vehicle seat assembly of claim 1 wherein the structural support portion has an average thickness of 5 to 100 mm and a compression strength at 50% strain of 0.30 to 0.50 MPa, as measured in accordance with ASTM test method No. D3575.

11. The vehicle seat assembly of claim 1 wherein the structural foam material comprises expanded polypropylene (EPP).

12. A vehicle battery pack cooling system, the system comprising:
    a vehicle floor;
    a seat assembly supported on the vehicle floor; and
    a battery pack for providing at least some of the power to the vehicle, the battery pack being supported behind the seat assembly;
    the vehicle seat assembly seat comprising a seat bottom and a seat back extending generally vertically from the seat bottom, the seat bottom comprising a structural support portion made of a first polymeric material and a foam seat cushion supported on the structural support portion, the structural support portion being supportable on the vehicle floor, the structural support portion communicating with the vehicle floor to form at least a portion of an air flow passage extending under the seat bottom, and the structural support portion further having a plurality of spaced-apart members cooperating with the vehicle floor to help support the seat assembly on the vehicle floor.

13. The vehicle battery pack cooling system of claim 12 wherein the first polymeric material has a tear strength of 1.8 to 3.2 gms/mm when measured in accordance with ASTM test method No. D3575.

14. The vehicle battery pack cooling system of claim 12 wherein seat bottom has a front, a back, a top, and a bottom, the structural support portion having a bottom surface forming at least a substantial portion of the bottom of the seat bottom and the foam seat cushion having an upper surface forming at least a substantial portion of the top of the seat bottom, the structural support portion having at least two opposed side walls extending between the front and the back of the seat bottom and being supportable on the vehicle floor, the vehicle floor and the opposed side walls cooperating to form at least part of the air flow passage.

15. The vehicle battery pack cooling system of claim 12 wherein the foam seat cushion is adhesively secured to the structural support portion.

16. The vehicle battery pack cooling system of claim 12 wherein the structural support portion has an average thickness of 5 to 100 mm and a compression strength at 50% strain of 0.30 to 0.50 MPa, as measured in accordance with ASTM test method No. D3575.

17. The vehicle battery pack cooling system of claim 12 wherein the first material comprises an expanded polyolefin (EPO).

18. The vehicle battery pack cooling system of claim 17 wherein the first material comprises expanded polypropylene (EPP).

19. A method of cooling a vehicle battery pack located in a vehicle having a vehicle floor, the method comprising:
    supporting a seat assembly on the vehicle floor;
    supporting a battery pack for providing at least some of the power to the vehicle behind the seat assembly;
    the vehicle seat assembly comprising a seat bottom and a seat back, the seat bottom comprising a structural support portion made of a first material and a foam seat cushion supported on the structural support portion, the first material being at least as resilient as the foam, the structural support portion communicating with the vehicle floor to help form an air flow passage extending under the seat bottom; and
    directing air flow through the air passage under the seat to provide cooling to the battery pack.

20. The method claim 19 wherein the seat bottom has a front, a back, a top, and a bottom, the structural support portion having a bottom surface forming at least a substantial portion of the bottom of the seat bottom and the foam seat cushion having an upper surface forming at least a substantial portion of the top of the seat bottom, the structural support portion having at least two opposed side walls extending substantially at an angle between the front and the back of the seat bottom and being supportable on the vehicle floor, the vehicle floor and the opposed side walls cooperating to form at least part of the air flow passage, and the structural support portion further having a plurality of spaced-apart support members cooperating with the vehicle floor to help support the seat assembly on the vehicle floor.

* * * * *